(12) United States Patent
Chen et al.

(10) Patent No.: US 7,357,448 B2
(45) Date of Patent: Apr. 15, 2008

(54) UNITARY HYDROFORMED ROOF SUPPORT PILLAR

(75) Inventors: Xiaoming Chen, Canton, MI (US); Omar Faruque, Ann Arbor, MI (US); Thierry Guimberteau, Livonia, MI (US); Everett Kuo, Troy, MI (US); Raj Mehta, Westland, MI (US); David Wagner, Northville, MI (US); Dean Gericke, Brighton, MI (US); Daniel Szalay, Belleville, MI (US)

(73) Assignees: Ford Global Technologies, LLC, Dearborn, MI (US); Vari-Form, Inc., Warren, MI (US)

( * ) Notice: Subject to any disclaimer, the term of this patent is extended or adjusted under 35 U.S.C. 154(b) by 0 days.

(21) Appl. No.: 11/276,276

(22) Filed: Feb. 22, 2006

(65) Prior Publication Data

US 2006/0273630 A1 Dec. 7, 2006

Related U.S. Application Data

(60) Provisional application No. 60/687,666, filed on Jun. 6, 2005.

(51) Int. Cl.
*B62D 25/04* (2006.01)
(52) U.S. Cl. .......................... 296/203.03; 296/187.12; 296/193.06; 296/205; 296/193.05
(58) Field of Classification Search .......... 296/203.03, 296/29, 203.01, 193.05, 193.06, 187.12, 296/30, 146.6, 205
See application file for complete search history.

(56) References Cited

U.S. PATENT DOCUMENTS

| | | | | |
|---|---|---|---|---|
| 4,899,843 A | * | 2/1990 | Takano et al. .............. 180/312 |
| 5,382,071 A | * | 1/1995 | Enning et al. .......... 296/203.03 |
| 5,549,352 A | * | 8/1996 | Janotik et al. .............. 296/209 |
| 5,884,722 A | * | 3/1999 | Durand et al. .............. 180/312 |
| 5,984,402 A | * | 11/1999 | Takeuchi ................ 296/187.12 |
| 6,086,141 A | * | 7/2000 | Masuda et al. ........... 296/193.1 |
| 6,092,865 A | * | 7/2000 | Jaekel et al. ................. 296/205 |
| 6,102,472 A | | 8/2000 | Wallstroem |
| 6,179,370 B1 | * | 1/2001 | Takeuchi ................ 296/187.12 |
| 6,217,109 B1 | * | 4/2001 | Okana et al. ........... 296/203.03 |
| 6,250,657 B1 | * | 6/2001 | Valin et al. ............... 280/124.1 |
| 6,282,790 B1 | * | 9/2001 | Jaekel et al. ................ 29/897.2 |

(Continued)

FOREIGN PATENT DOCUMENTS

WO WO 03/070543 8/2003

*Primary Examiner*—Christopher P. Ellis
*Assistant Examiner*—Greg Blankenship
(74) *Attorney, Agent, or Firm*—Frederick Owens; Brooks Kushman P.C.

(57) ABSTRACT

A one-piece B-pillar having a front flange and a rear flange formed on an upper portion of the B-pillar. The front and rear flanges extend forwardly and rearwardly from a trapezoidal section of the B-pillar. An inner concave portion is provided in a lower portion of the B-pillar. The one-piece B-pillar is secured to the outer and upper surfaces of a roof rail and to the outer surface of a rocker to provide side impact strength. The B-pillar is hydroformed in one-piece to provide superior strength for roof crush performance. The tubular portion of the B-pillar is partially collapsed to form a trapezoidal section in the upper portion of the B-pillar.

17 Claims, 3 Drawing Sheets

U.S. PATENT DOCUMENTS

| | | | |
|---|---|---|---|
| 6,315,353 B1 * | 11/2001 | Brodt et al. | 296/203.03 |
| 6,322,135 B1 * | 11/2001 | Okana et al. | 296/203.03 |
| 6,332,643 B1 * | 12/2001 | Sukegawa et al. | 296/203.03 |
| 6,416,119 B1 * | 7/2002 | Gericke et al. | 296/205 |
| 6,431,641 B2 * | 8/2002 | Miyasaka | 296/203.03 |
| 6,474,726 B1 * | 11/2002 | Hanakawa et al. | 296/191 |
| 6,533,347 B2 * | 3/2003 | Sanada | 296/203.02 |
| 6,533,348 B1 * | 3/2003 | Jaekel et al. | 296/205 |
| 6,578,909 B1 | 6/2003 | Reed et al. | |
| 6,607,239 B1 * | 8/2003 | Fuji | 296/203.03 |
| 6,648,403 B2 * | 11/2003 | Hanyu | 296/203.03 |
| 6,702,368 B1 * | 3/2004 | Hanyu | 296/193.06 |
| 6,811,212 B2 * | 11/2004 | Kasuga | 296/205 |
| 6,824,204 B2 | 11/2004 | Gabbianelli et al. | |
| 6,854,795 B2 * | 2/2005 | Yamazaki et al. | 296/209 |
| 6,976,730 B2 * | 12/2005 | Mally et al. | 296/203.03 |
| 6,983,981 B2 * | 1/2006 | Saeki | 296/187.12 |
| 6,988,763 B2 * | 1/2006 | Saeki | 296/187.123 |
| 7,001,097 B2 * | 2/2006 | Wang et al. | 403/231 |
| 7,036,874 B2 * | 5/2006 | Stojkovic et al. | 296/193.09 |
| 7,212,615 B2 * | 5/2007 | Hoshino | 296/203.03 |
| 7,213,874 B2 * | 5/2007 | Osterberg et al. | 296/210 |
| 2004/0239091 A1 | 12/2004 | Horton et al. | |
| 2005/0023865 A1 | 2/2005 | Rager | |
| 2006/0273630 A1 | 12/2006 | Chen et al. | |

* cited by examiner

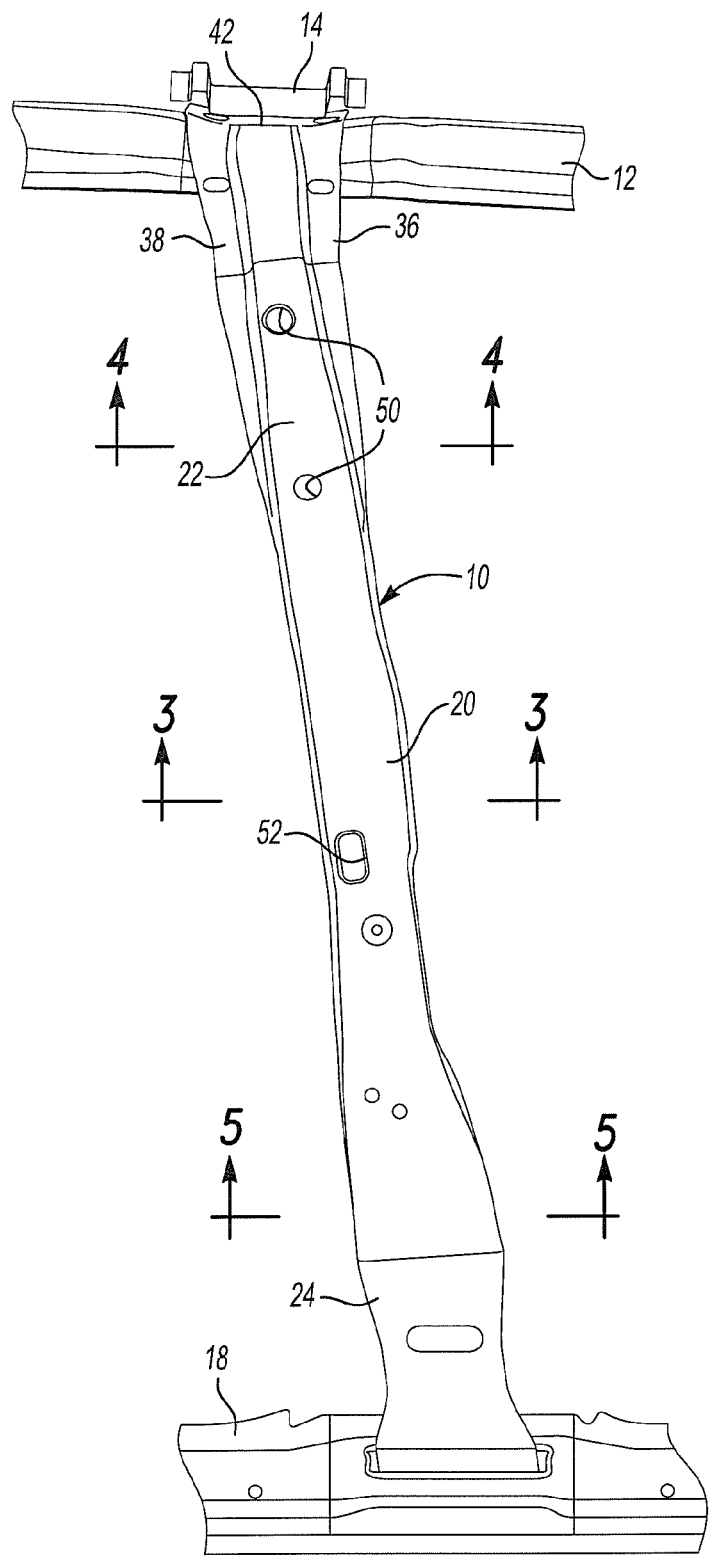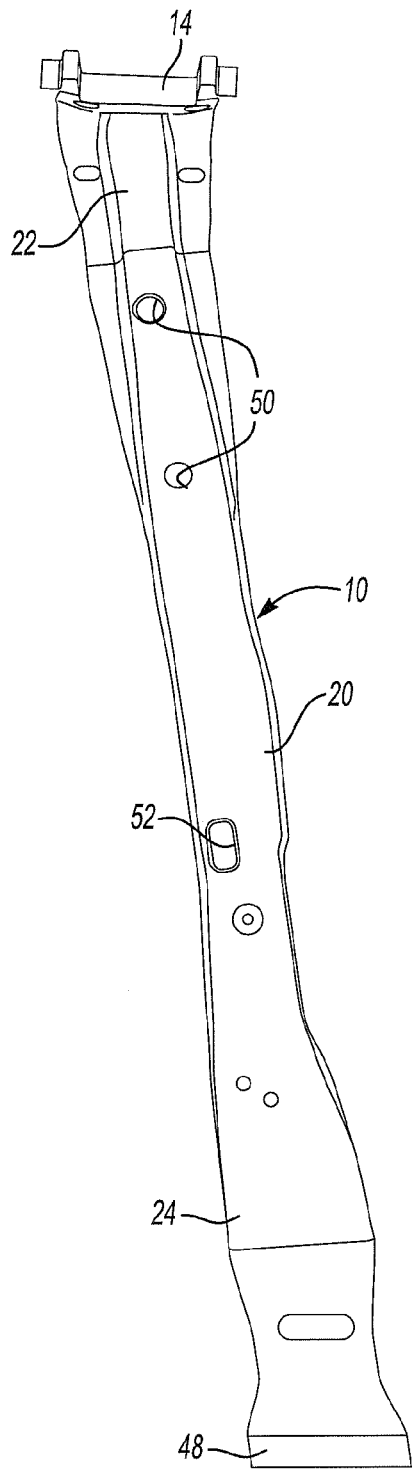
Fig-1
Fig-2

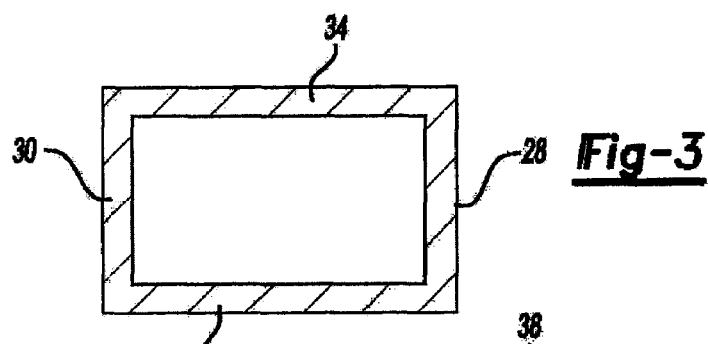
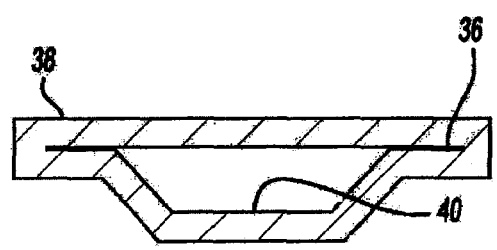
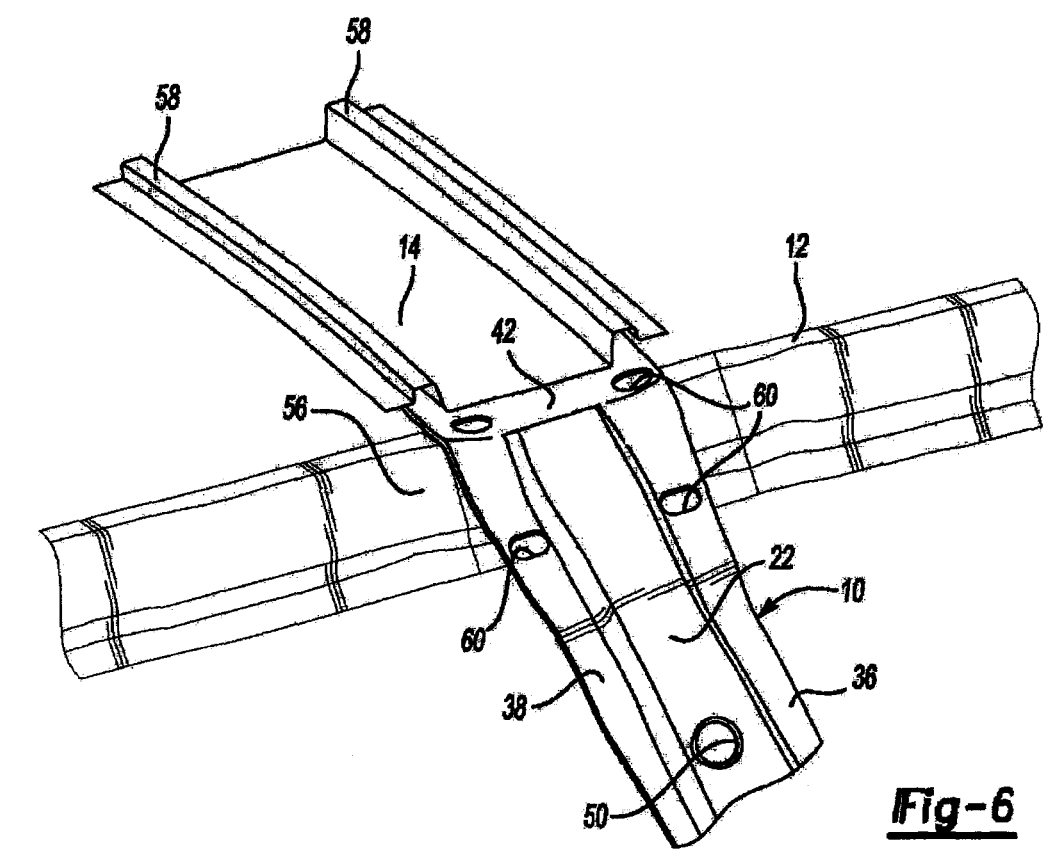

UNITARY HYDROFORMED ROOF SUPPORT PILLAR

CROSS-REFERENCE TO RELATED APPLICATIONS

This application claims the benefit of U.S. provisional application Ser. No. 60/687,666 filed Jun. 6, 2005.

BACKGROUND OF THE INVENTION

1. Field of the Invention

The present invention relates to a unitary hydroformed roof support pillar for a vehicle.

2. Background Art

Roof support pillars support the roof of a vehicle and are located between the windows and doors of a vehicle. Roof support pillars are frequently identified as A, B, C and in some instances D-pillars depending on the vehicle style. A B-pillar is generally located immediately behind the front door of a vehicle. The B-pillar is an important element in determining roof strength and the degree of side impact intrusion.

Passenger vehicle designs are tested for roof strength and side impact strength. Conventional B-pillars are fabricated as multiple stamped sheet metal parts that are generally spot welded together. It is possible to improve the strength of conventional B-pillars by forming the sheet metal parts from high grade material, such as dual phase and boron steels. B-pillars may also be made stronger by using thicker gauge sheet metal components. However, the use of high strength alloys and thicker sheet metal may increase the weight of a vehicle and also increases the cost to manufacture the B-pillar. Even with the use of thicker alloy components, B-pillars of conventional design may not always meet stringent test requirements for roof strength and side impact performance.

It has been proposed to use hydroformed tubes to fabricate vehicles having space frame construction in, for example, U.S. Pat. No. 6,282,790. This patent proposes integrally forming two B-pillars and a roof bow in a single U-shaped piece that is connected to the top surface of two tubular rockers. This proposed design presents a manufacturing problem in that the closed box section of the parts precludes spot welding assembly techniques. Also, the longitudinal thickness of the hydroformed tube portion between vehicle doors is objectionable from a styling standpoint.

Other proposed designs for hydroformed B-pillars are disclosed in published U.S. patent application US 2004/0239091 A1 and published U.S. patent application US 2005/0023865 A1. However, these proposed designs require reinforcing brackets to connect the B-pillar to a roof rail. In addition, the B-pillar is not reinforced by the roof rail and rocker panel members. In the event of a side impact intrusion, the connection of the B-pillar to the roof rail and rocker must rely upon welds for structural integrity. In addition, the width of the B-pillar in the longitudinal vehicle direction limits styling and adversely impacts vehicle appearance.

The present invention is directed to solving the above problems and other problems relating to the manufacture of a roof support pillar with minimum part count and improved roof crush and side impact performance. Prior art methods of hydroforming roof support pillars face technical barriers relating to the hydroforming procedure, methods of joining hydroformed components and packaging constraints. In particular, it is difficult for a hydroformed tube that has a uniform perimeter to accommodate desired section variations for vehicle styling.

Prior art multiple-piece B-pillars are designed to connect the roof rail, rocker and body outer panels. Connection between these elements are critical for vehicle body strength and noise, vibration and hardness (NVH) joint stiffness. Packaging constraints for B-pillars include providing clearance for seatbelt retractors and adequate mounting surfaces for door latch and hinge reinforcements.

The above problems and design challenges are addressed by applicants' invention as summarized below.

SUMMARY OF THE INVENTION

According to one aspect of the present invention a roof support assembly is provided in part by a roof rail and rocker panel that are connected by a one piece partially hollow support pillar. The support pillar has an inner wall, an outer wall, a front wall and a rear wall. The support pillar has a tubular lower section that extends upwardly from the rocker panel and an upper section that extends upwardly from the lower section. The upper section has a convergent tubular shape formed by the inner wall, the outer wall, the front wall and the rear wall that converge in the vertical direction. The convergent tubular section has flanges extending longitudinally from the front wall and the rear wall. The upper end of the convergent tubular section terminates in a compressed roof rail flange that includes only the inner wall and the outer wall. The compressed roof rail flange is assembled to an outer surface and upper surface of the roof rail.

According to another aspect of the present invention, a roof support pillar for a vehicle is provided for supporting a vehicle roof over a passenger compartment. The pillar is disposed adjacent a rear edge of the vehicle door that provides access to a front seat of the vehicle. The vehicle has a roof rail and a rocker panel that are interconnected by the roof support pillar. The roof support pillar comprises a unitary and partially tubular member having a closed roof rail flange on an upper end and a closed rocker panel flange on a lower end. The roof rail flange is assembled to the roof rail on a surface of the roof rail that is on the opposite side of the roof rail from the passenger compartment. The rocker flange is assembled to the rocker panel on a surface of the rocker panel that is on the opposite side of the rocker panel from the passenger compartment.

According to another aspect of the present invention a roof support pillar that is disposed between a front row of seats and a rear row of seats of the vehicle is provided. The roof support pillar comprises a hollow tubular body having a roof rail flange on the upper end and a rocker flange on the lower end. A seatbelt retractor cavity is formed in the tubular portion adjacent to the lower end of the pillar. The roof rail flange is welded to an outer surface of the roof rail and the rocker flange is welded to an outer surface of the rocker.

According to other aspects of the present invention, the support pillar may have a tubular lower section that terminates in a compressed rocker flange that includes only an inner wall and an outer wall and that is assembled to an outer surface of the rocker panel. The rocker flange may extend around to the bottom surface of the rocker panel. The rocker flange may have a spot weld flange disposed below the rocker panel. The tubular lower portion of the support pillar may have an inner wall that defines a concave portion in which a seatbelt retractor may be assembled.

The roof rail defines an indentation relative to an outer surface of the roof onto which the roof rail flange of the support pillar is received. The roof rail flange preferably has at least two layers of metal wherein at least one layer of metal is removed from certain portions to facilitate spot welding the roof rail flange to the roof rail. The roof rail flange overlaps and is welded to an end flange of a transversely extending roof bow.

According to another aspect of the invention, an upper portion of the tubular body portion may have a tubular rectilinear cross section at a belt line of the vehicle. The rectilinear cross section of the upper portion of the tubular body portion is reduced in the vertical vehicle direction. The forwardly extending flange and rearwardly extending flange of the upper portion of the tubular body may increase in longitudinal extent along the vertical vehicle direction. The forward extending flange and rearward extending flange are formed by collapsing a portion of the tubular member from which the tubular portion is formed in the hydroforming operation.

According to further aspects of the invention, the rocker flange on the lower end of the tubular body portion may be formed by collapsing a portion of the tubular member from which the tubular body portion is formed.

These and other aspects of the present invention will be better understood in view of the attached drawings and following detailed description of the illustrated embodiment of the invention.

BRIEF DESCRIPTION OF THE DRAWINGS

FIG. 1 is a fragmentary side elevation view of a B-pillar, roof rail, roof bow and rocker;

FIG. 2 is a side elevation view of a B-pillar;

FIG. 3 is a cross-sectional view taken along the line 3-3 in FIG. 1;

FIG. 4 is a cross-sectional view taken along the line 4-4 in FIG. 1;

FIG. 5 is a cross-sectional view taken along the line 5-5 in FIG. 1;

FIG. 6 is a fragmentary perspective view of a B-pillar, roof rail and roof bow.

DETAILED DESCRIPTION OF THE PREFERRED EMBODIMENT(S)

Figure 7:
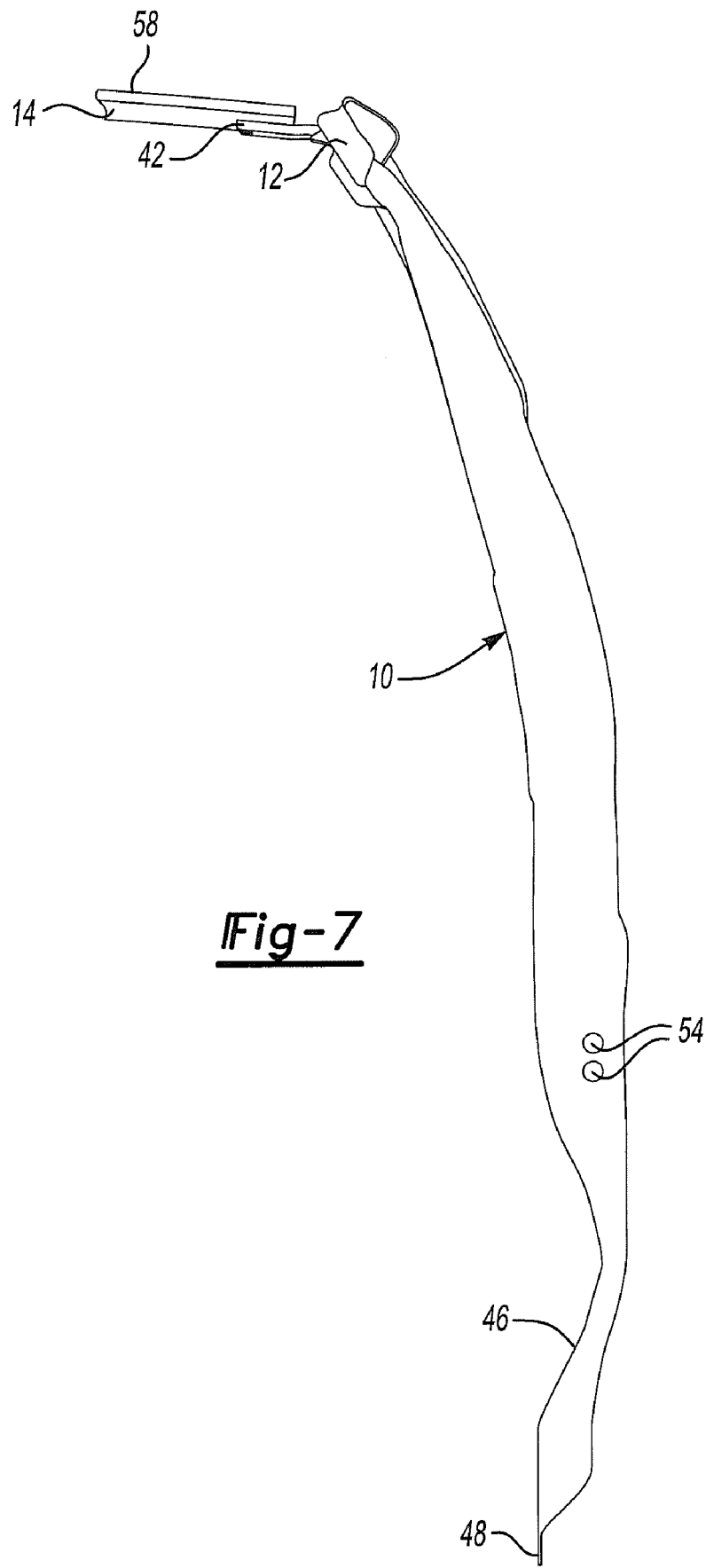
FIG. 7 is a fragmentary front elevation view of a B-pillar, roof rail and roof bow.

Referring to FIG. 1, a one-piece B-pillar 10 is shown attached to a roof rail 12 and roof bow 14. The B-pillar 10 is also attached to a rocker 18.

The B-pillar 10 has a middle portion 20 and an upper portion 22 extending upwardly from the middle portion 20. A lower portion 24 extends downwardly from the middle portion 20. Referring to FIG. 3, which is a cross section taken through the middle portion 20, the cross section of the B-pillar 10 in that area includes a front wall 28, a rear wall 30, and outer wall 32 and an inner wall 34. The four walls 28-34 form a substantially rectangular box shaped beam.

Referring to FIG. 4, a cross section taken through the upper portion 22 of the B-pillar 10 is illustrated. A front flange 36 and a rear flange 38 extend forwardly and rearwardly, respectively, from a trapezoidal section 40. The trapezoidal section 40 extends upwardly as a continuation of the walls 28-34 with the front wall 28 and rear wall 30 converging toward the outer wall 32 in the vertical direction. The upper portion 22 of the B-pillar 10 terminates in a flat top portion 42. The flat top portion 42 extends on the outer and upper sides of the roof rail 12 and is received below the roof bow 14.

Referring to FIG. 5, a cross section taken through the lower portion 24 of the B-pillar 10 is shown to define an inner concave portion 46. The inner concave portion 46 may receive a seat belt retractor mechanism (not shown) if desired.

Referring to FIG. 2, the one-piece B-pillar 10 is shown in conjunction with the roof bow 14. The B-pillar 10 includes on its lower portion 24 the inner concave portion 46 that leads to a rocker attachment flange 48 at its lower end. The B-pillar includes D-ring attachment holes 50 and a wiring duct access hole 52.

Referring to FIG. 6, the connection between the B-pillar 10, roof rail 12 and roof bow 14 is shown in greater detail. The upper portion 22 of the B-pillar 10 includes a front flange 36 and a rear flange 38 that are formed in a hydroforming operation by compressing the beam from which the B-pillar is formed. The upper portion 22 of the B-pillar 10 may be seated in an indentation 56 formed on the roof rail 12. Ribs 58 may be formed on the roof bow 14 to provide the desired degree of rigidity and reinforce the roof structure.

A plurality of weld access areas may be provided in front and rear flanges 36 and 38 by removing a single layer area 60 of the tubular blank prior to the hydroforming operation. The single layer area 60 facilitates welding operations for joining the roof rail to the B-pillar.

Referring to FIG. 7, the B-pillar 10 is secured to a body side outer panel (not shown). The B-pillar is joined to the roof rail 12 and the roof bow 14 at its upper end. Hinge hardware holes 54 or other door hardware such as striker plates or locking plates may be secured to the front wall 28 and rear wall 30 of the B-pillar by means of holes such as hinge hardware holes 54. The upper end of the B-pillar includes the flat top portion 42 that extends over the roof rail 12 and under the roof bow 14 as previously described.

While the best mode for carrying out the invention has been described in detail, those familiar with the art to which this invention relates will recognize various alternative designs and embodiments for practicing the invention as defined by the following claims.

What is claimed:

1. A vehicle roof support assembly, comprising:
   a roof rail;
   a rocker panel;
   a one-piece, partially hollow support pillar having an inner wall, an outer wall, a front wall and a rear wall, the support pillar having a tubular lower section that extends upwardly from the rocker panel, an upper section that extends downwardly from the roof rail, the upper section has a convergent tubular shape formed by the inner wall, the outer wall, the front wall, and the rear wall that converge in the vertically upward direction, the convergent tubular section having flanges extending longitudinally from the front wall and the rear wall, wherein the flanges extending from the front wall and the rear wall begin at an intermediate point on the front wall and rear wall and increase in longitudinal extent in the vertical vehicle direction, the upper end of the convergent tubular section terminating in a top portion that includes only the inner wall and the outer wall that are compressed together and that is assembled to an outer surface and an upper surface of the roof rail.

2. The vehicle roof support assembly of claim 1 wherein the tubular lower section terminates in a compressed rocker attachment flange that includes only an inner wall and an outer wall and that is assembled to an outer surface of the rocker panel.

3. The vehicle roof support assembly of claim 2 wherein the rocker attachment flange extends around to the rocker panel.

4. The vehicle roof support assembly of claim 3 wherein the rocker attachment flange spot welded to the rocker panel.

5. The vehicle roof support assembly of claim 1 wherein the tubular lower portion has an inner wall that defines a concave portion.

6. The vehicle roof support assembly of claim 1 wherein the roof rail defines an indentation relative to an outer surface of the roof onto which the top portion of the support pillar is received.

7. The vehicle roof support assembly of claim 1 wherein the top portion has at least two layers of metal and wherein at least one layer of metal is removed in limited areas to facilitate spot welding the roof rail to the roof rail.

8. The vehicle roof support assembly of claim 1 further comprising a roof bow extending in a transverse vehicle direction and wherein an end flange of the roof bow overlaps the roof rail and is welded to the end flange.

9. A roof support pillar for a vehicle that supports the vehicle roof over a passenger compartment, the pillar being disposed adjacent a rear edge of a vehicle door for access to a front seat, the vehicle having a roof rail and a rocker panel, the roof support pillar comprising:
a unitary and partially tubular member having a closed roof rail flange on an upper end and a closed rocker panel flange on a lower end, a front flange extending forwardly from the tubular member beginning at an intermediate point along the length of the tubular member and increasing in forward extent in the vertical direction, and a rear flange extending rearwardly from the tubular member beginning at an intermediate point along the length of the tubular member and increasing in rearward extent in the vertical direction;
wherein the top portion is assembled to the roof rail on a surface of the roof rail that is on the opposite side of the roof rail from the passenger compartment; and
wherein the rocker attachment flange is assembled to the rocker panel on a surface of the rocker panel that is on the opposite side of the rocker panel from the passenger compartment.

10. The roof support pillar of claim 9 wherein the rocker attachment panel flange may be spot welded to the rocker panel.

11. The roof support pillar of claim 9 wherein the pillar has an inner wall that defines a concave portion.

12. The roof support pillar of claim 9 wherein the roof rail defines an indentation relative to an outer surface of the roof onto which the top portion is received.

13. The roof support pillar of claim 9 wherein the top portion has at least two layers of metal and wherein at least one layer of metal is removed in limited areas to facilitate spot welding the top portion to the roof rail.

14. The roof support pillar of claim 9 further comprising a roof bow extending in a transverse vehicle direction and wherein an end flange of the roof bow overlaps the top portion and is welded to the end flange.

15. A roof support pillar disposed between a front row of seats and a rear row of seats of a vehicle, the roof support pillar comprising:
a one-piece hollow tubular body having a top portion on an upper end and a rocker attachment flange on a lower end, wherein an upper portion of the tubular body portion has a tubular rectilinear cross-section at a beltline of the vehicle and further wherein the rectilinear cross-section of the upper portion of the tubular body portion is reduced in the vertical vehicle direction, and wherein the upper portion of the tubular body portion has a forward extending flange and a rearward extending flange, wherein the forward and rearward extending flanges begin above the beltline and increase in longitudinal extent in the vertical vehicle direction;
a seat belt retractor cavity being formed in the tubular portion and adjacent to the lower end; and
wherein the top portion is welded to an outer surface of the roof rail and the rocker attachment flange is welded to an outer surface of the rocker.

16. The roof support pillar of claim 15 wherein the top portion, the forward extending flange, and the rearward extending flange are formed by collapsing a portion of a tubular member from which the tubular body portion is formed in a hydroforming operation.

17. The roof support pillar of claim 15 wherein the rocker attachment flange on the lower end of the tubular body portion is formed by collapsing a portion of a tubular member from which the tubular body portion is formed.

* * * * *